(12) United States Patent
Pabst

(10) Patent No.: US 7,981,279 B2
(45) Date of Patent: Jul. 19, 2011

(54) OIL FILTER WITH BYPASS VALVE

(75) Inventor: Thomas Pabst, Leonberg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 898 days.

(21) Appl. No.: 11/944,124

(22) Filed: Nov. 21, 2007

(65) Prior Publication Data

US 2008/0121575 A1    May 29, 2008

(30) Foreign Application Priority Data

Nov. 23, 2006 (DE) .................. 10 2006 055 285

(51) Int. Cl.
*B01D 27/10* (2006.01)
*B01D 35/00* (2006.01)
*B01D 35/14* (2006.01)
*B01D 35/147* (2006.01)

(52) U.S. Cl. ....... 210/130; 210/90; 210/94; 210/167.02; 210/172.1; 210/172.2; 210/257; 210/416.5; 210/430; 210/436; 210/472; 137/557; 137/559

(58) Field of Classification Search ............... 210/130, 210/90, 94, 247, 416.5, 167.02, 172.1, 172.2, 210/430
See application file for complete search history.

(56) References Cited

U.S. PATENT DOCUMENTS

| 3,464,556 | A | * | 9/1969 | Cullen | 210/90 |
| 3,501,005 | A | * | 3/1970 | Thomas et al. | 210/90 |
| 3,545,616 | A | | 12/1970 | Aspinwall et al. | |
| 3,786,920 | A | * | 1/1974 | Raymond | 210/90 |
| 4,853,125 | A | * | 8/1989 | Hanabusa | 210/172.2 |
| 2002/0125178 | A1 | * | 9/2002 | Smith et al. | 210/90 |
| 2006/0124099 | A1 | * | 6/2006 | Richards | 123/196 R |

* cited by examiner

*Primary Examiner* — Duane Smith
*Assistant Examiner* — Paul J. Durand

(57) ABSTRACT

An oil filter assembly has a bypass valve and a cover formed with an orifice. In order to provide a simple contamination indicator for the oil filter, there is provided a deflection device that deflects an oil jet emerging through the orifice when the bypass valve is open on the outside of the cover. The oil jet can thus be deflected into a region observable through a filling orifice. A contaminated oil filter can therefore be reliably detected on occasion of a quick visual check, by observing the deflected oil jet.

10 Claims, 2 Drawing Sheets

OIL FILTER WITH BYPASS VALVE

CROSS-REFERENCE TO RELATED APPLICATION

This application claims the priority, under 35 U.S.C. §119, of German patent application DE 10 2006 055 285.7, filed Nov. 23, 2006; the prior application is herewith incorporated by reference in its entirety.

BACKGROUND OF THE INVENTION

Field of the Invention

The invention relates to an oil filter with a bypass valve and with a cover, the cover having an orifice. The invention also relates to an oil tank with an oil filter of this type.

The bypass valve of an oil filter serves to prevent the filter from collapsing or bursting under heavy load due to impurities. When the pressure in the filter rises to a specific value below the failure point of the filter, the bypass valve opens, with the result that oil can escape and flow around the actual filter element. A contaminated filter element is relieved in this way.

In order to indicate the contamination of a filter, an indicator device for a filter is known from U.S. Pat. No. 3,545,616. There, the indicator device has a shank which is connected to the bypass valve and which extends through the housing of the filter. A laterally extending indicator part is provided, connected to the shank, and has wings and serves for displaying various color strips of the indicator device, depending on the position of the bypass valve. The indicator device known from the said U.S. Pat. No. 3,545,616 has a relatively complicated construction and, because of this, is complicated in terms of production and is susceptible to faults during operation.

BRIEF SUMMARY OF THE INVENTION

It is accordingly an object of the invention to provide an oil filter with a bypass valve which overcomes the above-mentioned disadvantages of the heretofore-known devices and methods of this general type and which provide for an oil filter with a structurally simple contamination indicator that is cost-effective to produce.

With the foregoing and other objects in view there is provided, in accordance with the invention, an oil filter assembly, comprising:

an oil filter;

a bypass valve and a cover for said oil filter, said cover having an orifice formed therein; and a deflection device on an outside of said cover for deflecting an oil jet emerging through said orifice when said bypass valve is open.

In other words, the objects of the invention are achieved in an oil filter of the type described initially, by providing on the outside of the cover a deflection device for deflecting an oil jet emerging through the orifice of the cover when the bypass valve is open. An oil jet which in any case emerges when the bypass valve is open can thus be steered in a directed manner, at relatively low outlay in structural terms, into a region which can easily be inspected within the framework of a visual check or maintenance. A contaminated filter can therefore be detected reliably, simply and safely by virtue of the deflected oil jet. Complicated indicator devices consequently become unnecessary.

The deflection device may advantageously have a lateral orifice for the outlet of the deflected oil jet.

In an advantageous development, the deflection device may be designed in such a way that the oil jet is deflected essentially into a direction parallel to the top side of the cover. An unwanted splashing of the checking personnel by the oil jet can be avoided in this way.

In order to reduce the outlay in terms of production and assembly, the deflection device may preferably be produced in one piece with the cover.

Particularly cost-effective production can be made possible if the cover and the deflection device are produced as a one-piece injection molding.

In order to ensure that the deflected oil jet can be seen by the checking personnel, one or more sealing means may be provided in the annular gap between the oil filter and the cover.

Advantageously, an oil tank may have an oil filter according to the invention or according to one or more of its advantageous developments, the oil tank having a filling orifice, and the deflection device being designed in such a way that the oil jet emerging when the bypass valve is open is deflected into an easily observable region.

The oil jet may preferably be deflected into a region observable through the filling orifice.

The oil jet may advantageously be deflected into a region beneath the filling orifice.

Advantageously, an oil tank may have an oil filter according to the invention or according to one or more of its advantageous developments, the oil tank having a filling orifice, the housing of the oil tank being of at least partially transparent design, and the deflection device being designed in such a way that the oil jet is deflected into a region observable through the at least partially transparently designed housing.

Other features which are considered as characteristic for the invention are set forth in the appended claims.

Although the invention is illustrated and described herein as embodied in oil filter with bypass valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
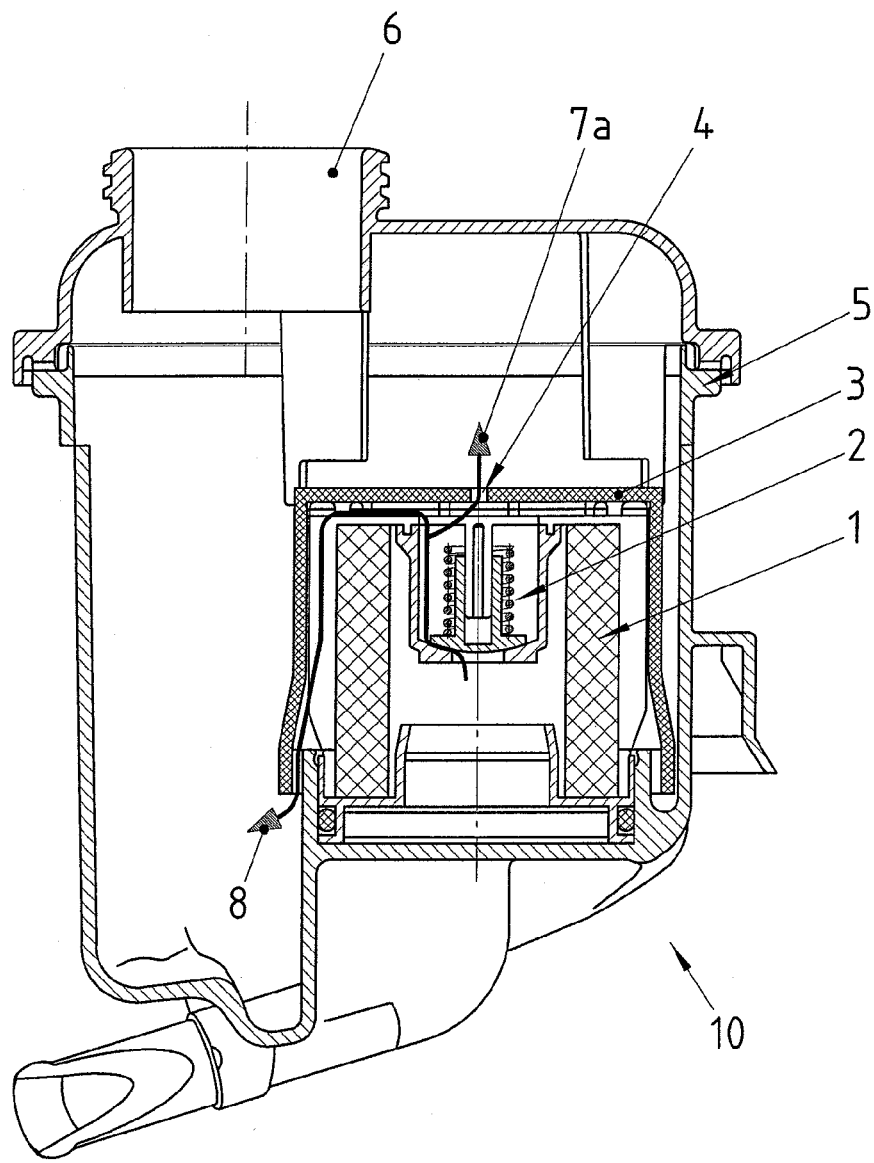
FIG. 1 is a sectional view through an oil filter without a deflection device.

Referring now to the figures of the drawing in detail, FIG. 1 shows an oil tank 10, such as is used, for example, as an integral part of a hydraulic system in a motor vehicle. An oil filter 1 is arranged, connected to the oil tank 10. The oil filter 1 is preferably arranged in the oil tank 10. The oil tank 10 has a housing 5. The housing 5 may have an upper part and a lower part which may be welded to one another.

When the oil filter 1 is contaminated (i.e., clogged), a bypass valve 2 opens in order to relieve the filter material of the oil filter 1. The oil filter 1 has a cover 3 which is designed, for example, as a cover cap and which has an orifice 4 which may serve, for example, for venting.

With the bypass valve 2 open, oil flows through the bypass valve 2 in order to relieve the filter material. A portion of the oil flowing through the bypass valve 2 runs downward on the oil filter 1 as an oil flow 8. Part of the oil flowing through the bypass valve 2 can emerge as an oil jet 7a through the orifice 4 of the cover 3 of the oil filter 1. The oil jet 7a cannot be detected by a straightforward visual check, and without the housing 5 of the oil tank 10 being opened. The oil jet 7a is located in a region which cannot be observed through the filling orifice 6 of the oil tank 10.

Figure 2:
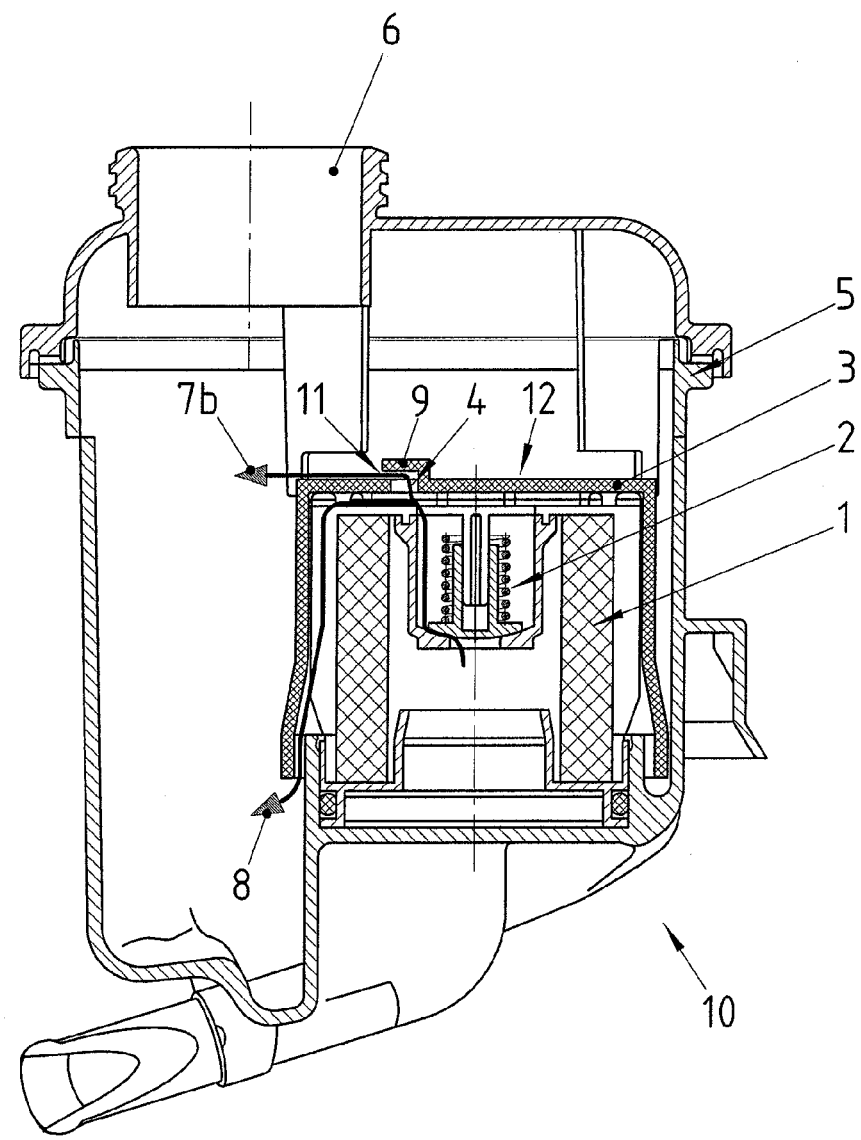
FIG. 2 is a similar view of an exemplary oil filter according to the invention.

FIG. 2 shows an exemplary embodiment of the invention. FIG. 2, as well, shows an oil tank 10, such as is used, for example, as a component part of a hydraulic system in a motor vehicle, and an oil filter 1. In contrast with the embodiment of FIG. 1, FIG. 2 shows a deflection device 9 for deflecting an oil jet emerging through the orifice 4 when the bypass valve 2 is open. The deflection device 9 is arranged above the orifice 4 of the cover 3 of the oil filter 1 and is preferably produced in one piece with the cover 3. If the cover 3 is produced by the injection molding method, the provision of the deflection device 9 requires only an extremely minor variation in the production method, as compared with the production of a known cover 3.

In the example shown, the deflection device 9 deflects the oil jet substantially into a horizontal direction, that is to say, as illustrated in FIG. 2, substantially into a direction parallel to the top side 12 of the cover 3 of the oil filter 1. The deflected oil jet 7b thereby runs approximately transversely beneath the filling orifice 6 of the oil tank 10 and can therefore easily be detected by checking personnel. In the example shown, the deflected oil jet 7b runs in the upper region, preferably in the upper half, of the housing 5 of the oil tank 10.

In the illustrated exemplary embodiment, the deflection device 9 forms a lateral orifice 11 on the side of the filling orifice. The orifice 4 of the cover 3 of the oil filter 1 may, for example, not be arranged centrally, but, instead, offset in the direction of the filling orifice 6, on the top side 12 of the cover 3 of the oil filter 1.

It may be expedient to seal off the annular gap between the oil filter 1 and the laterally continuous region of the cover 3, in order at least to reduce or to prevent the downward oil flow 8, with the result that the deflected oil jet 7b emerging through the orifice 4 and the deflection device 9 is intensified and therefore can be detected more easily. This is not illustrated in any more detail in the drawing.

The housing 5 may be partially or wholly transparent. By way of example, the housing wall may have at least one region which is designed to be partially transparent or at least as far as possible clearly transparent. It is also possible to integrate a viewing window, for instance, into the side wall of the container (e.g., the left-hand vertical wall in FIG. 2) which allows the deflected oil jet 7b to be directly visually observed. The deflection device 9 may be designed in such a way that the oil jet 7b is deflected into the region that is easily observable through the at least partially transparently designed housing 5.

A primarily important concept in connection with the invention is to deflect the oil jet 7b into a region which can be observed easily, that is to say with no or only little effort. According to the invention, a contaminated oil filter can be reliably detected, even during a quick visual check, by detecting the deflected oil jet 7b.

The invention claimed is:

1. An oil filter assembly, comprising:
   an oil filter having a bypass valve;
   a cover for said oil filter, said cover having an orifice formed therein; and
   a deflection device on an outside of said cover for deflecting an oil jet emerging through said orifice when said bypass valve is open.

2. The oil filter assembly according to claim 1, wherein said deflection device has a lateral orifice forming an outlet for the deflected oil jet.

3. The oil filter assembly according to claim 1, wherein said deflection device is configured to deflect the oil jet in a direction substantially parallel to a top side of said cover.

4. The oil filter assembly according to claim 1, wherein said deflection device is integrally formed in one piece with said cover.

5. The oil filter assembly according to claim 4, wherein said cover and said deflection device form a one-piece injection-molded part.

6. The oil filter assembly according to claim 1, which further comprises one or a plurality of seals disposed in an annular gap formed between said oil filter and said cover.

7. An oil tank assembly, comprising:
   an oil tank housing formed with a filling orifice and having an easily observable region;
   an oil filter assembly according to claim 1 disposed in said housing;
   and
   wherein said deflection device of said oil filter assembly is configured to deflect the oil jet into the easily observable region.

8. The oil tank assembly according to claim 7, wherein said deflection device is configured to deflect the oil jet into a region that is visually observable through said filling orifice.

9. The oil tank assembly according to claim 8, wherein said deflection device is configured to deflect the oil jet into a region beneath said filling orifice.

10. An oil tank assembly, comprising:
    a housing;
    an oil filter assembly according to claim 1 disposed in said housing;
    a filling orifice;
    wherein said the housing is at least partially transparent and said deflection device is configured to deflected the oil jet into a region in said housing that is observable through the at least partially transparent portion of said housing.

* * * * *